US012684077B2

(12) United States Patent
Munehiro

(10) Patent No.: US 12,684,077 B2
(45) Date of Patent: Jul. 14, 2026

(54) INFORMATION PROCESSING APPARATUS, IMAGE READING APPARATUS, IMAGE FORMING APPARATUS, NON-TRANSITORY COMPUTER READABLE MEDIUM, AND INFORMATION PROCESSING METHOD FOR CHANGING READING PROCESS ACCORDING TO DOCUMENT PLACEMENT

(71) Applicant: FUJIFILM Business Innovation Corp., Tokyo (JP)

(72) Inventor: Takuma Munehiro, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/180,925

(22) Filed: Mar. 9, 2023

(65) Prior Publication Data

US 2024/0106949 A1      Mar. 28, 2024

(30) Foreign Application Priority Data

Sep. 26, 2022      (JP) ................................. 2022-152757

(51) Int. Cl.
*H04N 1/00*               (2006.01)
(52) U.S. Cl.
CPC ..... *H04N 1/00809* (2013.01); *H04N 1/00702* (2013.01); *H04N 1/00721* (2013.01); *H04N 1/00766* (2013.01); *H04N 1/00777* (2013.01)

(58) Field of Classification Search
USPC .......................................................... 358/462
See application file for complete search history.

(56) References Cited

U.S. PATENT DOCUMENTS

| | | | |
|---|---|---|---|
| 9,179,036 B2 | 11/2015 | Horiuchi | |
| 2012/0154875 A1* | 6/2012 | Horiuchi ............ | H04N 1/00408 |
| | | | 358/447 |
| 2017/0244853 A1* | 8/2017 | Yabuuchi ........... | H04N 1/00708 |

FOREIGN PATENT DOCUMENTS

| | | | | |
|---|---|---|---|---|
| EP | 2434741 A1 * | 3/2012 | ......... | H04N 1/00702 |
| EP | 3 842 992 A1 | 6/2021 | | |
| JP | 2012-134773 A | 7/2012 | | |
| JP | 2021-103503 A | 7/2021 | | |

* cited by examiner

*Primary Examiner* — Jacky X Zheng
(74) *Attorney, Agent, or Firm* — Oliff PLC

(57) ABSTRACT

An information processing apparatus includes a processor configured to: obtain information about a form of placement of a document placed on a document stage of an apparatus that performs reading of the document by capturing an image of the document stage on which the document is placed; and change a process that is performed in association with reading of the document, in accordance with the form of placement of the document on the document stage.

13 Claims, 10 Drawing Sheets

Figure 2:
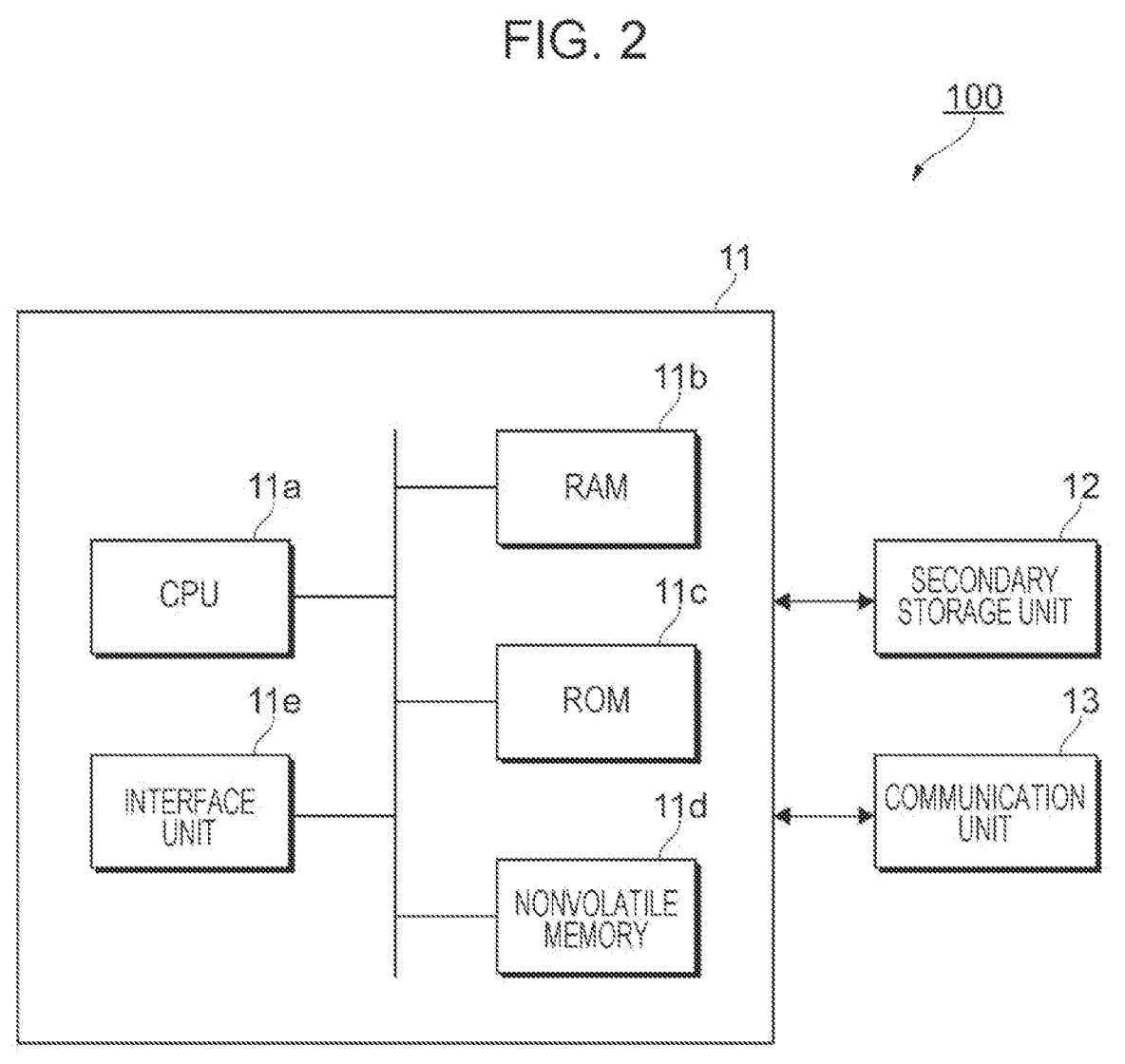

RAM

11a

CPU

11c

ROM

11e

INTERFACE
UNIT

11d

NONVOLATILE
MEMORY

12

SECONDARY
STORAGE UNIT

13

COMMUNICATION
UNIT

FIG. 9

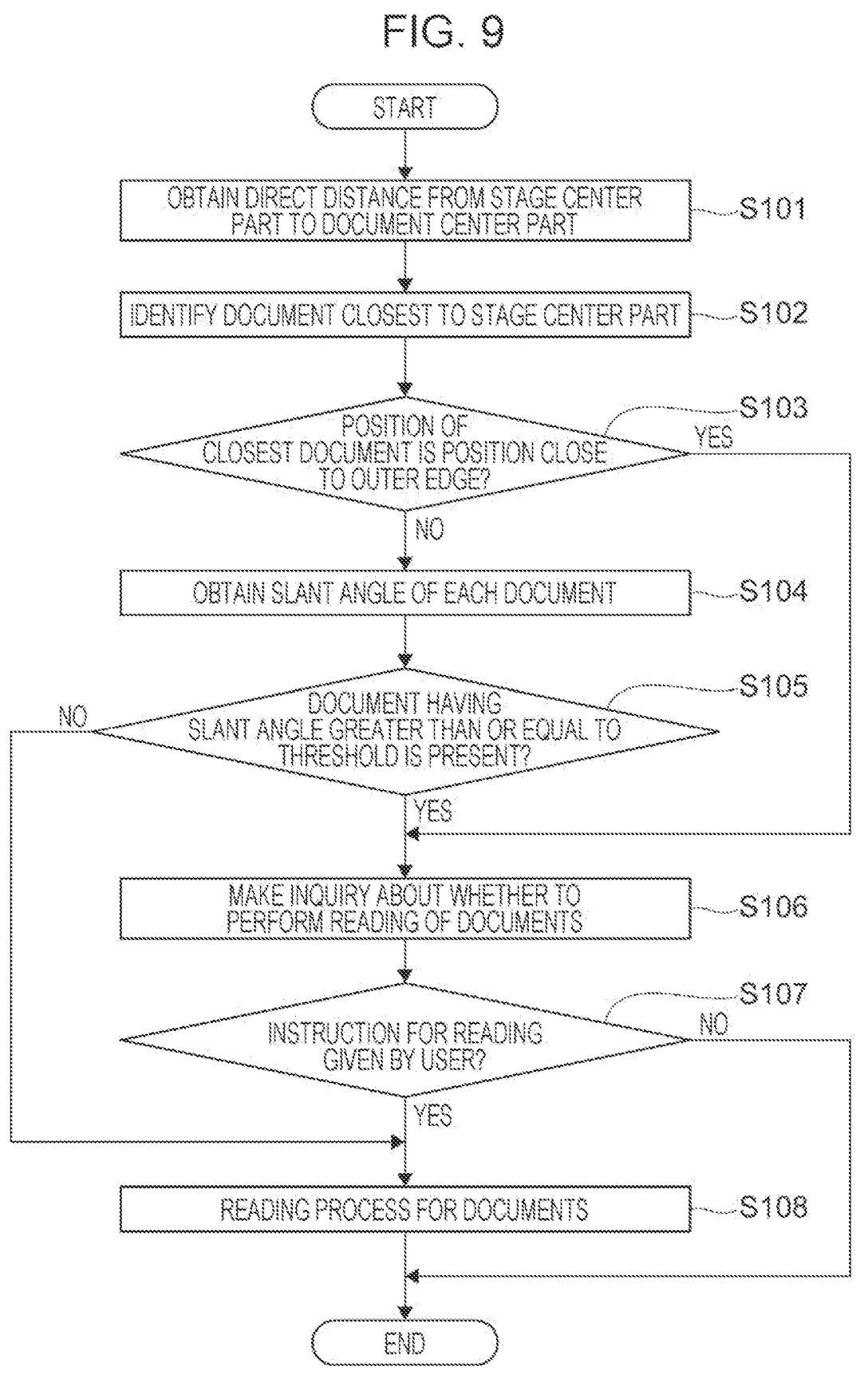

START

OBTAIN DIRECT DISTANCE FROM STAGE CENTER PART TO DOCUMENT CENTER PART — S101

IDENTIFY DOCUMENT CLOSEST TO STAGE CENTER PART — S102

POSITION OF CLOSEST DOCUMENT IS POSITION CLOSE TO OUTER EDGE? — S103
YES

NO

OBTAIN SLANT ANGLE OF EACH DOCUMENT — S104

DOCUMENT HAVING SLANT ANGLE GREATER THAN OR EQUAL TO THRESHOLD IS PRESENT? — S105
NO

YES

MAKE INQUIRY ABOUT WHETHER TO PERFORM READING OF DOCUMENTS — S106

INSTRUCTION FOR READING GIVEN BY USER? — S107
NO

YES

READING PROCESS FOR DOCUMENTS — S108

END

INFORMATION PROCESSING APPARATUS, IMAGE READING APPARATUS, IMAGE FORMING APPARATUS, NON-TRANSITORY COMPUTER READABLE MEDIUM, AND INFORMATION PROCESSING METHOD FOR CHANGING READING PROCESS ACCORDING TO DOCUMENT PLACEMENT

CROSS-REFERENCE TO RELATED APPLICATIONS

This application is based on and claims priority under 35 USC 119 from Japanese Patent Application No. 2022-152757 filed Sep. 26, 2022.

BACKGROUND

(i) Technical Field

The present disclosure relates to an information processing apparatus, an image reading apparatus, an image forming apparatus, a non-transitory computer readable medium, and an information processing method.

(ii) Related Art

Japanese Unexamined Patent Application Publication No. 2021-103503 discloses a target detection method including a step of, in a case where at least a part of a target object is not detected from an image, providing a prompt for adjusting the target object so as to be within a field-of-view of an image sensor.

Japanese Unexamined Patent Application Publication No. 2012-134773 discloses a process of, in a case where a document that is slanted is to be straightened and output and where a slanted document that is unable to be straightened is present, performing outputting while excluding the document.

SUMMARY

In an apparatus configured to read a document placed on a document stage, various processes including a reading process for the document are performed.

When the apparatus is configured to uniformly perform processes including the reading process regardless of the state of the document stage on which the document is placed, this may cause the inconvenience of the processes being performed although the processes need not be performed.

Aspects of non-limiting embodiments of the present disclosure relate to allowing a process that is performed in association with reading of a document to be changed in accordance with the form of placement of the document on a document stage.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising: a processor configured to: obtain information about a form of placement of a document placed on a document stage of an apparatus that performs reading of the document by capturing an image of the document stage on which the document is placed; and change a process that is performed in association with reading of the document, in accordance with the form of placement of the document on the document stage.

BRIEF DESCRIPTION OF THE DRAWINGS

An exemplary embodiment of the present disclosure will be described in detail based on the following figures, wherein:

FIG. 2 is a diagram for explaining a hardware configuration of an information processing apparatus;

FIG. 9 is a flowchart illustrating a flow of a series of processes performed by a central processing unit (CPU)

DETAILED DESCRIPTION

Hereinafter, an exemplary embodiment of the present disclosure will be described with reference to the attached drawings.

Figure 1:
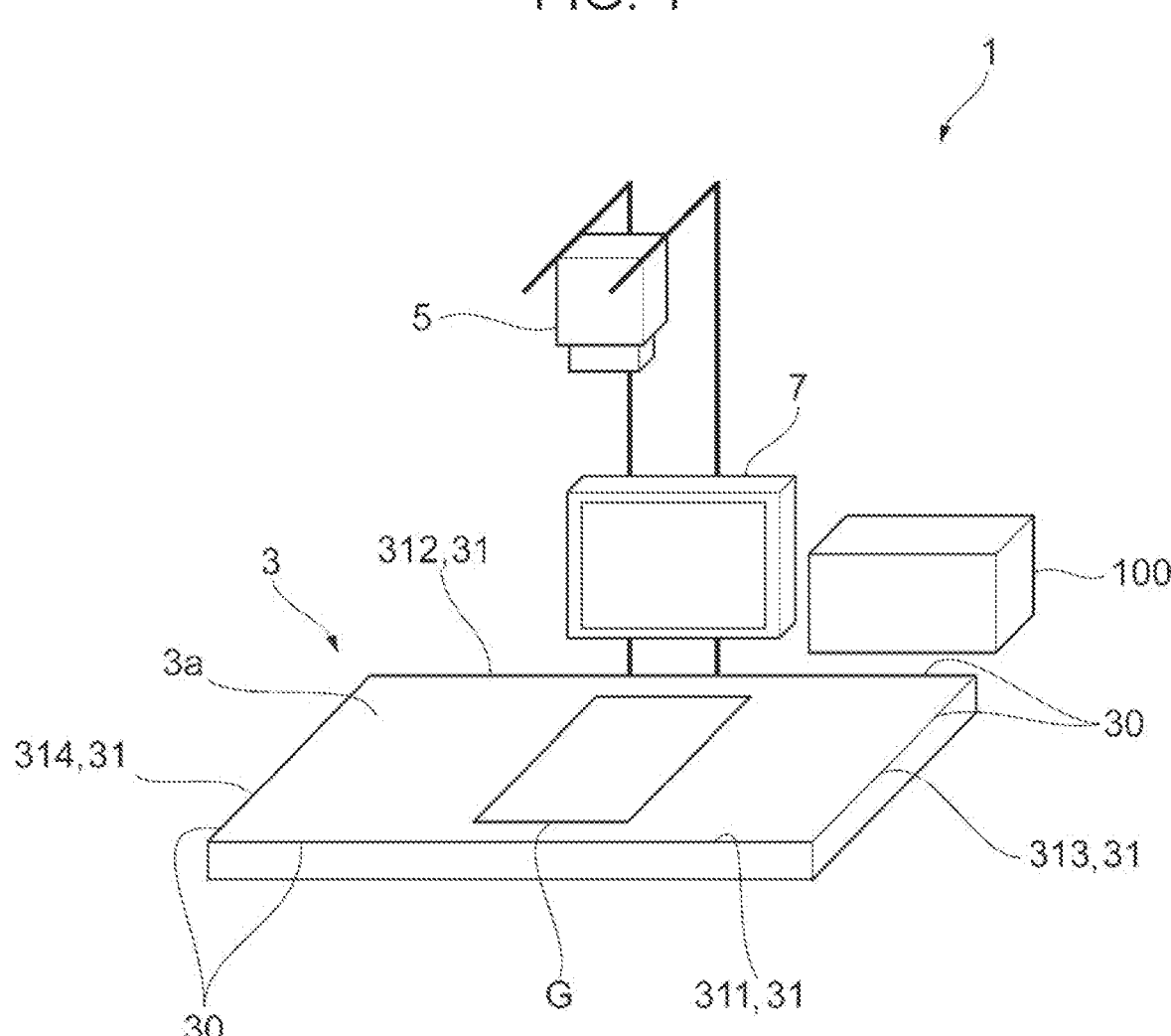
FIG. 1 is a diagram illustrating an overall configuration of an image reading apparatus.

FIG. 1 is a diagram illustrating an overall configuration of an image reading apparatus 1.

The image reading apparatus 1 of this exemplary embodiment is a document camera.

The image reading apparatus 1 is provided with a document stage 3 on which a document G that is an image reading target is placed, and which supports the document G from underneath, a camera 5 that is an example of an image capturing device and that captures an image of the document G placed on the document stage 3, and a display device 7 that displays information for a user.

The image reading apparatus 1 is an apparatus that performs reading of the document G by capturing an image of the document stage 3 on which the document G is placed.

The image reading apparatus 1 is further provided with an information processing apparatus 100 that processes information related to the image reading apparatus 1. The information processing apparatus 100 performs various types of processing including processing of information related to image capturing of the document G.

The information processing apparatus 100 is connected to the camera 5 and the display device 7 via a communication line not illustrated.

The camera 5 is disposed above the document stage 3 so as to be spaced apart from the document stage 3. The camera 5 includes an image sensor, such as a charge-coupled device (CCD) sensor, and captures an image of the document stage 3 positioned below. In this exemplary embodiment, the document stage 3 fits in the angle of view of the camera 5, and the camera 5 captures an image of the entire document stage 3.

The display device 7 is, for example, a liquid crystal display or an organic electroluminescent (EL) display and displays information to be provided to the user who operates the image reading apparatus 1.

In this exemplary embodiment, the display device 7 is a touch panel, and the display device 7 not only displays information but also accepts a user operation.

The document stage 3 has a rectangular shape. The document stage 3 has a rectangular outer edge 30 that surrounds the document stage 3.

In this exemplary embodiment, in the part of the outer edge 30, four side edges 31 are provided. In this exemplary embodiment, as the four side edges 31, a near-side edge 311, a far-side edge 312, a right-side edge 313, and a left-side edge 314 are provided.

In a case where the user operates the image reading apparatus 1, the user is present in front of the near-side edge 311. In other words, in this exemplary embodiment, the user is present at a position opposite to the position of the far-side edge 312 with the near-side edge 311 therebetween.

In this exemplary embodiment, image capturing of the document G is automatically performed.

In this exemplary embodiment, in response to the document G being placed on the document stage 3, the information processing apparatus 100 detects the document G on the basis of a video obtained by the camera 5.

In response to detecting the document G, the information processing apparatus 100 operates the camera 5 to perform image capturing of the document stage 3 on which the document G is placed. Accordingly, a captured image of the document G is obtained. This captured image is a still image.

Image capturing of the document G need not be automatically performed and may be performed in accordance with a user instruction.

FIG. 2 is a diagram for explaining a hardware configuration of the information processing apparatus 100.

The information processing apparatus 100 includes an arithmetic processing unit 11 that performs digital arithmetic processing in accordance with a program, a secondary storage unit 12 to which information including a program is recorded, and a communication unit 13 that transmits and receives information to and from an external apparatus.

The secondary storage unit 12 is implemented as an existing information storage device, such as a hard disk drive (HDD), a semiconductor memory, or a magnetic tape.

The arithmetic processing unit 11 includes a CPU 11a, which is an example of a processor. In this exemplary embodiment, the CPU 11a performs processes described below.

The arithmetic processing unit 11 further includes a random access memory (RAM) 11b that is used as, for example, a work memory of the CPU 11a and a read-only memory (ROM) 11c that stores, for example, a program executed by the CPU 11a.

The arithmetic processing unit 11 further includes a nonvolatile memory 11d that is configured so as to be rewritable and that is able to retain data even in a case where power supply is stopped, and an interface unit 11e that controls units including the communication unit 13 connected to the arithmetic processing unit 11.

The nonvolatile memory 11d is, for example, a static random access memory (SRAM) or a flash memory backed up by a battery.

In this exemplary embodiment, when the CPU 11a reads the program stored in the secondary storage unit 12 or the ROM 11c, processes described below are performed.

The arithmetic processing unit 11, the secondary storage unit 12, and the communication unit 13 are connected to each other via a bus or a signal line.

The program executed by the CPU 11a may be stored in a computer-readable recording medium, such as a magnetic recording medium (for example, a magnetic tape or a magnetic disk), an optical recording medium (for example, an optical disc), a magneto-optical recording medium, or a semiconductor memory, and provided to the information processing apparatus 100. The program executed by the CPU 11a may be provided to the information processing apparatus 100 by using communication, such as the Internet.

In the specification, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The term "processor" is broad enough to encompass one processor or plural processors in collaboration which are located physically apart from each other but may work cooperatively. The order of operations of the processor is not limited to one described in this exemplary embodiment, and may be changed.

In this exemplary embodiment, in a case where reading of the document G is performed by the image reading apparatus 1, first, the document G is placed on the document stage 3 as illustrated in FIG. 1.

Next, image capturing by the camera 5 is performed, and a captured image obtained by image capturing of the document stage 3 is obtained. More specifically, in this exemplary embodiment, in response to the document G on the document stage 3 remaining stationary for more than a predetermined duration, the camera 5 is operated, and image capturing of the document stage 3 by the camera 5 is performed.

More specifically, in this exemplary embodiment, in a case where a rectangular-shape image is kept present in a video obtained by the camera 5 for more than the predetermined duration, the camera 5 is operated, and image capturing of the document stage 3 by the camera 5 is performed. Accordingly, a captured image that is a still image is obtained.

In this exemplary embodiment, in a case where, for example, the document G is bent and a rectangular-shape image is not present in a video obtained by the camera 5, the camera 5 is not operated, and image capturing of the document stage 3 by the camera 5 is not performed.

In response to image capturing of the document stage 3 being performed and a captured image being obtained, the CPU 11a performs a process of extracting and obtaining, from the captured image, a part (hereinafter referred to as "document image") in which the document G is present. Next, the document image is stored in the secondary storage unit 12, which is an example of an information storage.

In this exemplary embodiment, image capturing of the entire document stage 3 is performed by the camera 5, and the captured image includes not only an image of the document G but also an image of the document stage 3.

In this exemplary embodiment, a document image is obtained from the captured image, and the document image is stored in the secondary storage unit 12. Thereafter, in this exemplary embodiment, the user removes the document G from the document stage 3.

Although an example case where a document image is obtained from the captured image and the document image is stored in the secondary storage unit 12 has been described above, a document image need not be obtained and the captured image may be stored in the secondary storage unit 12, which is an example of the information storage.

The information storage in which the captured image and the document image are stored may be provided in an apparatus different from the image reading apparatus 1, and the captured image and the document image may be stored in the information storage provided in the apparatus different from the image reading apparatus 1.

Figure 3:
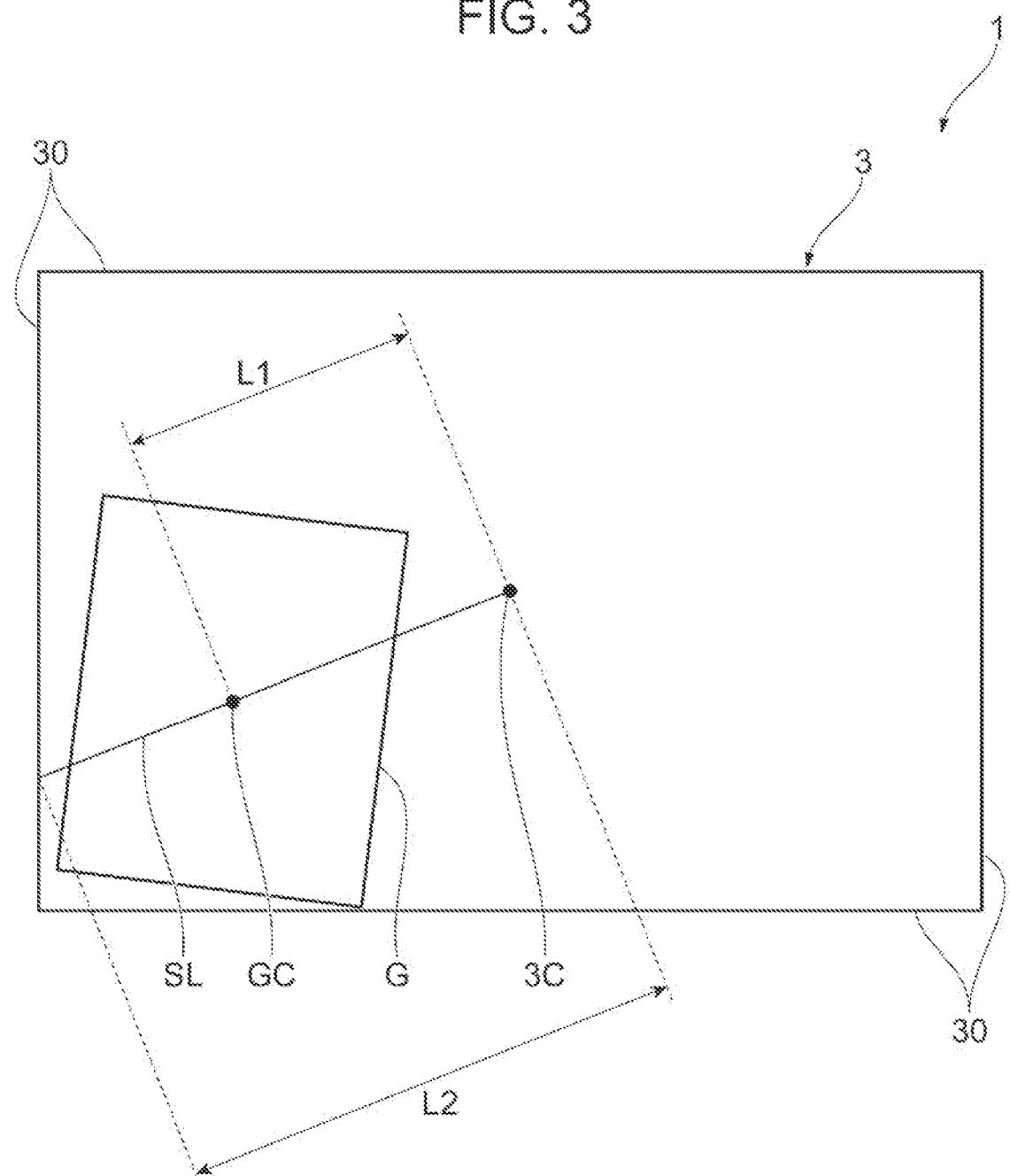
FIG. 3 is a diagram illustrating an example state of a document stage on which a document is placed.

FIG. 3 is a diagram illustrating another example state of the document stage 3 on which the documents G is placed. FIG. 3 illustrates a state in a case where the document stage 3 is viewed from above the document stage 3.

Although a description has been omitted above, in this exemplary embodiment, in response to the document G being placed on the document stage 3, the CPU 11*a* (see FIG. 2), which is an example of the processor, obtains information about the form of placement of the document G placed on the document stage 3.

Specifically, the CPU 11*a* analyzes a video (hereinafter referred to as "document stage video") obtained by image capturing of the document stage 3 by the camera 5 (see FIG. 1) to obtain information about the form of placement of the document G placed on the document stage 3.

In this exemplary embodiment, while the power of the image reading apparatus 1 is turned on, image capturing of the document stage 3 by the camera 5 is continuously performed. The CPU 11*a* analyzes the document stage video obtained by this image capturing by the camera 5 to obtain information about the form of placement of the document G placed on the document stage 3.

The CPU 11*a* changes a process that is performed in association with reading of the document G, in accordance with the obtained form of placement of the document G.

More specifically, the CPU 11*a* changes a process that is performed in association with reading of the document G, in accordance with, for example, the position of the document G placed on the document stage 3.

Specifically, in a case where, for example, the position of the document G placed on the document stage 3 is a predetermined specific position, such as an edge of the document stage 3, the CPU 11*a* does not allow a specific process that is performed in association with reading of the document G, such as an image capturing process for the document G, to be performed.

In other words, in a case where the position of the document G placed on the document stage 3 is a position close to the outer edge 30 of the document stage 3, the CPU 11*a* does not allow the specific process that is performed in association with reading of the document G, such as an image capturing process for the document G, to be performed.

On the other hand, in a case where the position of the document G placed on the document stage 3 is not the specific position described above but, for example, a center part 3C of the document stage 3, the CPU 11*a* allows the specific process, such as an image capturing process for the document G, to be performed.

In a case where the position of the document G placed on the document stage 3 is the specific position, such as a position close to the outer edge 30 of the document stage 3 as illustrated in FIG. 3, the CPU 11*a* does not allow reading of the document G by the image reading apparatus 1 to be performed.

In other words, in a case where the position of the document G placed on the document stage 3 is a position close to the outer edge 30 of the document stage 3, the CPU

11*a* does not allow a reading process for the document G, which is an example of the predetermined specific process, to be performed.

More specifically, in this case, the CPU 11*a* does not allow capturing of a still image of the document stage 3 to be performed.

In this case, the CPU 11*a* does not allow storing, in the secondary storage unit 12, of a reading result obtained by reading the document G to be performed.

In this case, storing of a captured image in the secondary storage unit 12 or storing of a document image in the secondary storage unit 12 is not performed.

On the other hand, in a case where the position of the document G placed on the document stage 3 is not the specific position described above, such as in a case where the position of the document G is the center part 3C of the document stage 3, the CPU 11*a* allows reading of the document G by the image reading apparatus 1 to be performed. In other words, in this case, the CPU 11*a* allows capturing of a still image of the document stage 3 to be performed.

In this case, the CPU 11*a* allows storing, in the secondary storage unit 12, of a reading result obtained by reading the document G to be performed. In other words, in this case, the CPU 11*a* allows storing of the captured image in the secondary storage unit 12 and storing of the document image in the secondary storage unit 12 to be performed.

In this exemplary embodiment, as described above, in a case where the position of the document G is the specific position, such as a position close to the outer edge 30 of the document stage 3, capturing of a still image of the document stage 3 is not performed.

In this case, storing of a still image, which is a reading result, in the secondary storage unit 12 is not performed.

On the other hand, in this exemplary embodiment, as described above, in a case where the position of the document G is not the specific position, such as in a case where the position of the document G is the center part 3C of the document stage 3, capturing of a still image of the document stage 3 is performed. In this case, storing of this still image in the secondary storage unit 12 is performed.

The CPU 11*a* determines whether the position of the document G is a position close to the outer edge 30 of the document stage 3, on the basis of the position of a center part GC (hereinafter referred to as "document center part GC") of the document G placed on the document stage 3.

More specifically, in this exemplary embodiment, the CPU 11*a* determines whether the position of the document G is a position close to the outer edge 30 of the document stage 3, on the basis of the direct distance L1 from the center part 3C (hereinafter referred to as "stage center part 3C") of the document stage 3 to the document center part GC and the length L2 of the straight line SL obtained by extending the straight line extending from the stage center part 3C toward the document center part GC up to the outer edge 30 of the document stage 3.

More specifically, in a case where the direct distance L1 is greater than or equal to 50% of the length L2, the CPU 11*a* determines that the position of the document G is a position close to the outer edge 30 of the document stage 3.

In a case where the direct distance L1 is less than 50% of the length L2, the CPU 11*a* determines that the position of the document G is not a position close to the outer edge 30 of the document stage 3.

In response to determining that the position of the document G is a position close to the outer edge 30 of the document stage 3, the CPU 11*a* does not allow reading of the document G to be performed as described above. In response to determining that the position of the document G is not a position close to the outer edge 30 of the document stage 3, the CPU 11*a* allows reading of the document G to be performed.

The above-described threshold, which is 50%, set as the ratio of the direct distance L1 to the length L2 is an example, and the threshold may be set to a value other than 50%.

For this threshold, a specified value may be accepted from the user, and the value accepted from the user may be set as the threshold.

Figure 4:
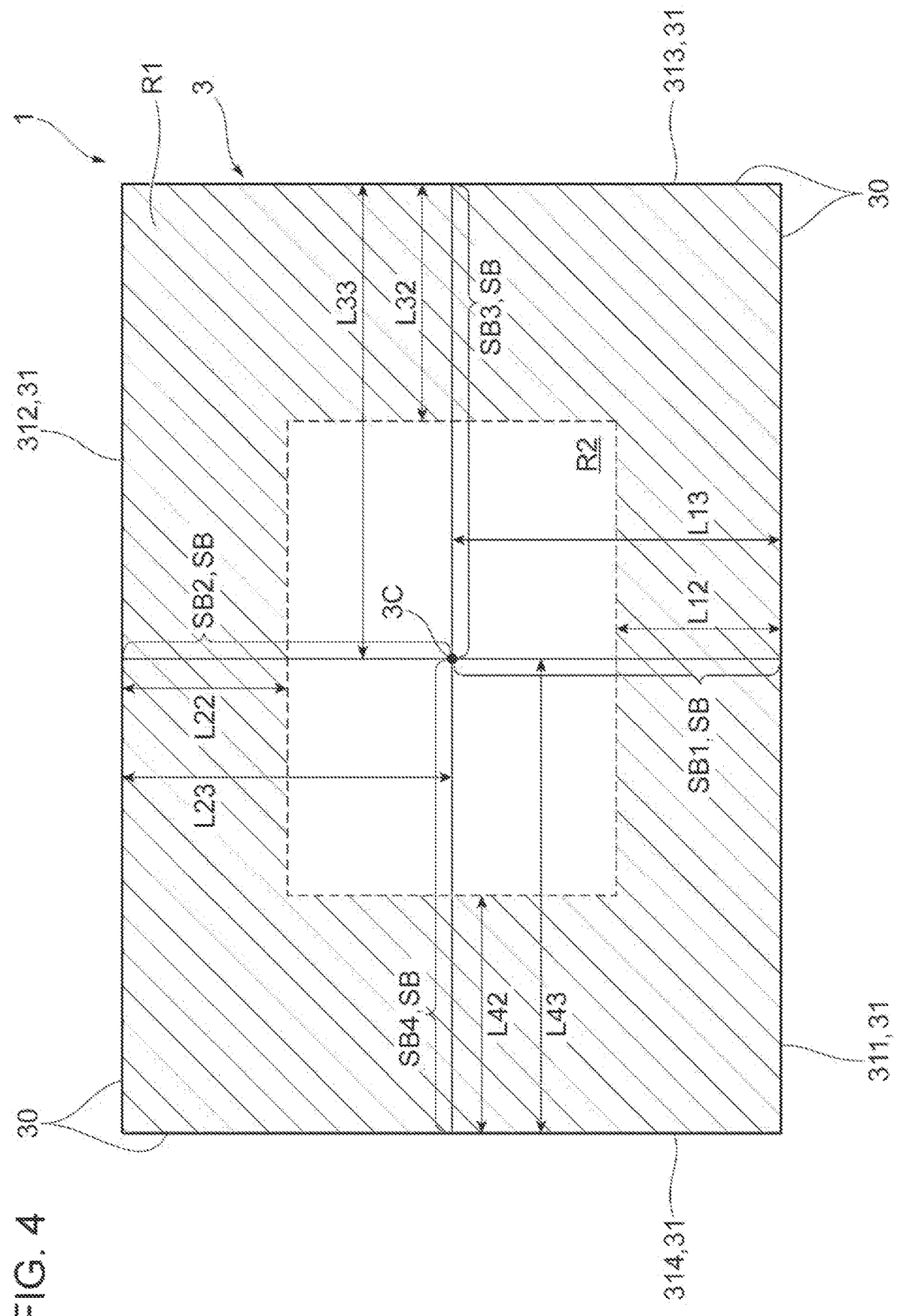
FIG. 4 is a diagram for explaining a region in which reading of a document is not performed.

In a case where reading of the document G is not performed when the direct distance L1 exceeds 50% of the length L2, reading of the document G is not performed when the document center part GC (not illustrated in FIG. 4) is present within a region R1, which is a hatched part in FIG. 4 (which is a diagram for explaining a region in which reading of the document G is not performed).

The region R1, which is a hatched part in FIG. 4, is a predetermined surrounding region (hereinafter referred to as "surrounding region R1") that is positioned around the stage center part 3C, and in this exemplary embodiment, in a case where the position of the document G is within the surrounding region R1, reading of the document G is not performed.

More specifically, in this exemplary embodiment, in a case where the position of the document center part GC is within the surrounding region R1, reading of the document G as a still image is not performed.

In the example illustrated in FIG. 4, a rectangular region (hereinafter referred to as "surrounded region R2") surrounded by the surrounding region R1 is present.

In this exemplary embodiment, in a case where the position of the document G placed on the document stage 3 is within the surrounded region R2, reading of the document G by the image reading apparatus 1 is performed.

More specifically, in a case where the position of the document center part GC is within the surrounded region R2, reading of the document G by the image reading apparatus 1 as a still image is performed.

In this exemplary embodiment, there may be a case where the user places the document G on the document stage 3 for a purpose other than the purpose of reading of the document G. Specifically, there may be a case where the user places the document G on the document stage 3 for the purpose of temporarily placing the document G. In other words, the user may use the document stage 3 as a place for placing something thereon.

In this case, in this exemplary embodiment, in a case where the user places the document G at a position close to the outer edge 30 of the document stage 3, image capturing by the camera 5, which is an image capturing device, is not performed and storing, in the secondary storage unit 12, of a reading result for the document G is not performed.

On the other hand, in this exemplary embodiment, in a case where the user places the document G at a position other than a position close to the outer edge 30 of the document stage 3, image capturing by the camera 5 is performed, and storing, in the secondary storage unit 12, of a reading result for the document G is performed.

In the process described above, determination as to whether the user places the document G at a position close to the outer edge 30 of the document stage 3 is performed on the basis of the position of the document center part GC.

Determination as to whether the user places the document G at a position close to the outer edge 30 of the document stage 3 may be performed on the basis of other information.

Figure 5:
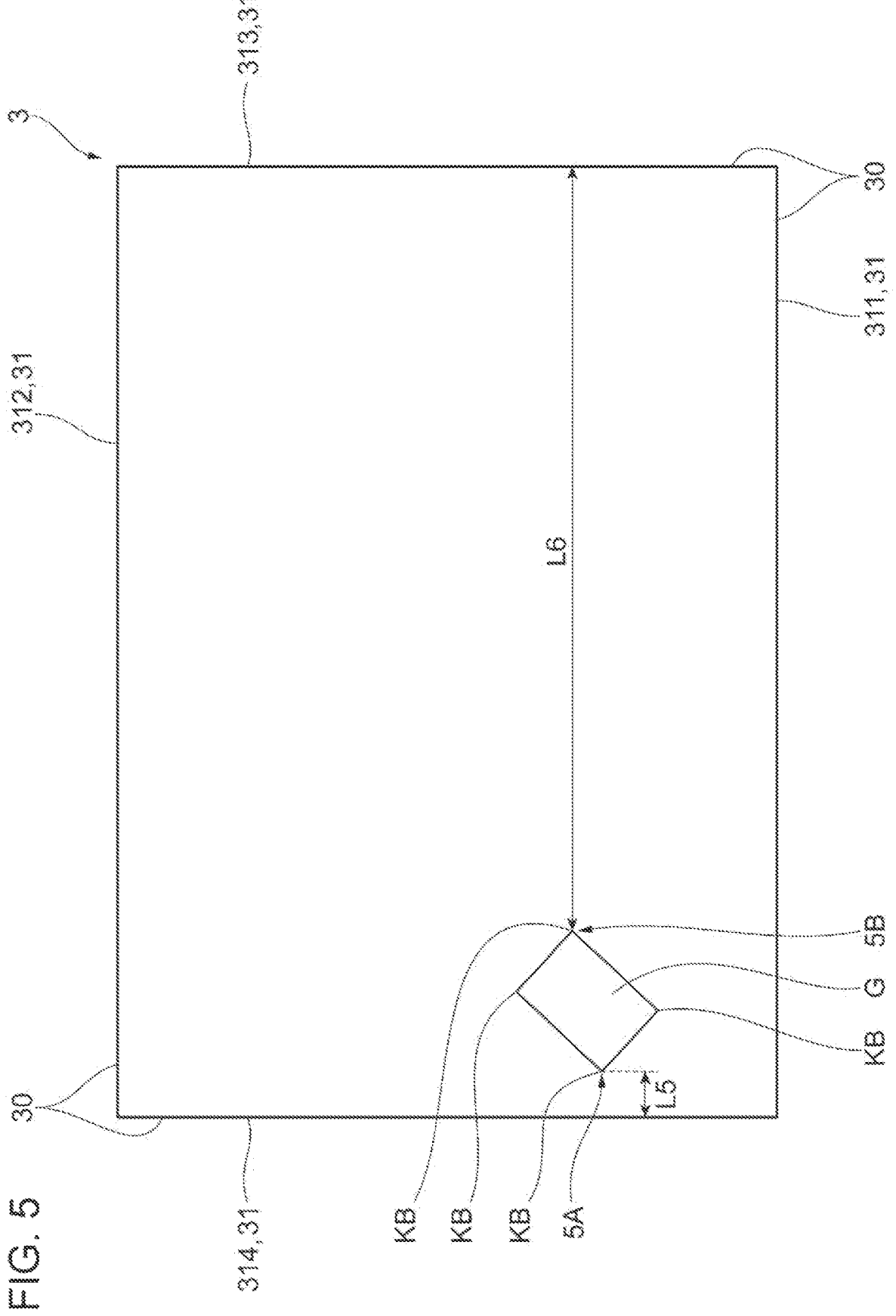
FIG. 5 is a diagram illustrating another example state of the document stage on which a document is placed.

For example, as illustrated in FIG. 5 (which is a diagram illustrating another example state of the document stage on which a document is placed), determination as to whether the user places the document G at a position close to the outer edge 30 may be performed on the basis of the distance L5 between a part, of the document G, closest to the outer edge 30 of the document stage 3 and the outer edge 30 and the size of the document G.

In this case, for example, when the distance L5 between the part, of the document G, closest to the outer edge 30 and the outer edge 30 is short and the size of the document G is a size of a name card, it is determined that the user places the document G at a position close to the outer edge 30 of the document stage 3.

Note that in the specification, the distance between the outer edge 30 and the document G is the shortest distance between the outer edge 30 and the document G. In other words, the distance between the outer edge 30 and the document G is the distance between the closest side edge 31 in the outer edge 30 and the document G on a perpendicular line perpendicular to the side edge 31 and passing through the closest part of the document G.

Alternatively, for each corner part KB of the four corner parts KB of the document G having a rectangular shape, the distance from the corner part KB to the side edge 31 present at a position facing the corner part KB may be calculated, and on the basis of the respective distances, determination as to whether the user places the document G at a position close to the outer edge 30 of the document stage 3 may be performed.

In a case where the user places the document G at a position close to the outer edge 30 as illustrated in FIG. 5, the distance L5 from a corner part KB indicated by a reference numeral 5A to the left-side edge 314 and the distance L6 from another corner part KB indicated by a reference numeral 5B and positioned diagonally to the corner part KB to the right-side edge 313 are different from each other to a large degree.

In a case where the ratio between the two calculated distances exceeds a predetermined threshold, it may be determined that the document G is placed at a position close to the outer edge 30.

Although FIG. 4 illustrates an example where it is determined that the document G is placed at a position close to the outer edge 30 of the document stage 3 in a case where the document center part GC (not illustrated in FIG. 4) is present within the surrounding region R1, it may be determined that the document G is placed at a position close to the outer edge 30 of the document stage 3 in a case where not the document center part GC but a part of the document G, such as a corner part KB, is present within the surrounding region R1.

In a case where a part of the document G is present within the surrounding region R1 and it is determined that the document G is placed at a position close to the outer edge 30, the size of the document G may be taken into consideration upon this determination.

Specifically, in a case where, for example, a part of the document G is present within the surrounding region R1 and the size of the document G is smaller than or equal to a predetermined size, it may be determined that the document G is placed at a position close to the outer edge 30.

In a case where the document G having a large size is placed in a landscape orientation, a part of the document G is present within the surrounding region R1 even when the document G is placed in the stage center part 3C. In this case, it is not desirable to determine that the document G is placed at a position close to the outer edge 30 of the document stage 3.

Accordingly, determination may be performed by taking into consideration the size of the document G as described above.

In a case where a part of the document G is present within the surrounding region R1 and the size of the document G is smaller than or equal to the predetermined size and where it is determined that the document G is placed at a position close to the outer edge 30, erroneous determination as described above that may occur when the document G having a large size is placed is less likely to be performed.

In the example illustrated in FIG. 4, on the line segment SB2 that connects the stage center part 3C and the far-side edge 312 of the document stage 3, the length L22 of the surrounding region R1 is equal to 50% of the length L23 of the line segment SB2.

Similarly, on the line segment SB1 that connects the stage center part 3C and the near-side edge 311 of the document stage 3, the length L12 of the surrounding region R1 is equal to 50% of the length L13 of the line segment SB1.

Further, on the line segment SB3 that connects the stage center part 3C and the right-side edge 313 of the document stage 3, the length L32 of the surrounding region R1 is equal to 50% of the length L33 of the line segment SB3.

Further, on the line segment SB4 that connects the stage center part 3C and the left-side edge 314 of the document stage 3, the length L42 of the surrounding region R1 is equal to 50% of the length L43 of the line segment SB4.

In this exemplary embodiment, on the line segment SB that connects the stage center part 3C and each side edge 31 of the document stage 3, the ratio of the length of the surrounding region R1 to the length of the line segment SB is 50%, which is an example of a specific value.

Here, the ratio of the length of the surrounding region R1 to the length of each line segment SB may be set to a different value depending on the line segment SB.

Specifically, for example, on the line segment SB2 that connects the stage center part 3C and the far-side edge 312 and on the line segment SB1 that connects the stage center part 3C and the near-side edge 311, the above-described ratio may be set to 50%, and on the line segment SB3 that connects the stage center part 3C and the right-side edge 313 and on the line segment SB4 that connects the stage center part 3C and the left-side edge 314, the above-described ratio may be set to, for example, 60%.

In a case where the user uses the document stage 3 as a place for placing something and temporarily places the document G, the user is highly likely to place the document G on the right or left edge of the document stage 3.

When the above-described ratio is increased on the line segment SB3 that connects the stage center part 3C and the right-side edge 313 and on the line segment SB4 that connects the stage center part 3C and the left-side edge 314 as described above, for the document G placed on the right or left edge of the document stage 3, the possibility that the document G is determined to be temporarily placed increases.

In this case, for the document G placed on the right or left edge of the document stage 3, reading by the image reading apparatus 1 is less likely to be performed than for the document G placed on the far-side or near-side edge of the document stage 3.

Figure 6:
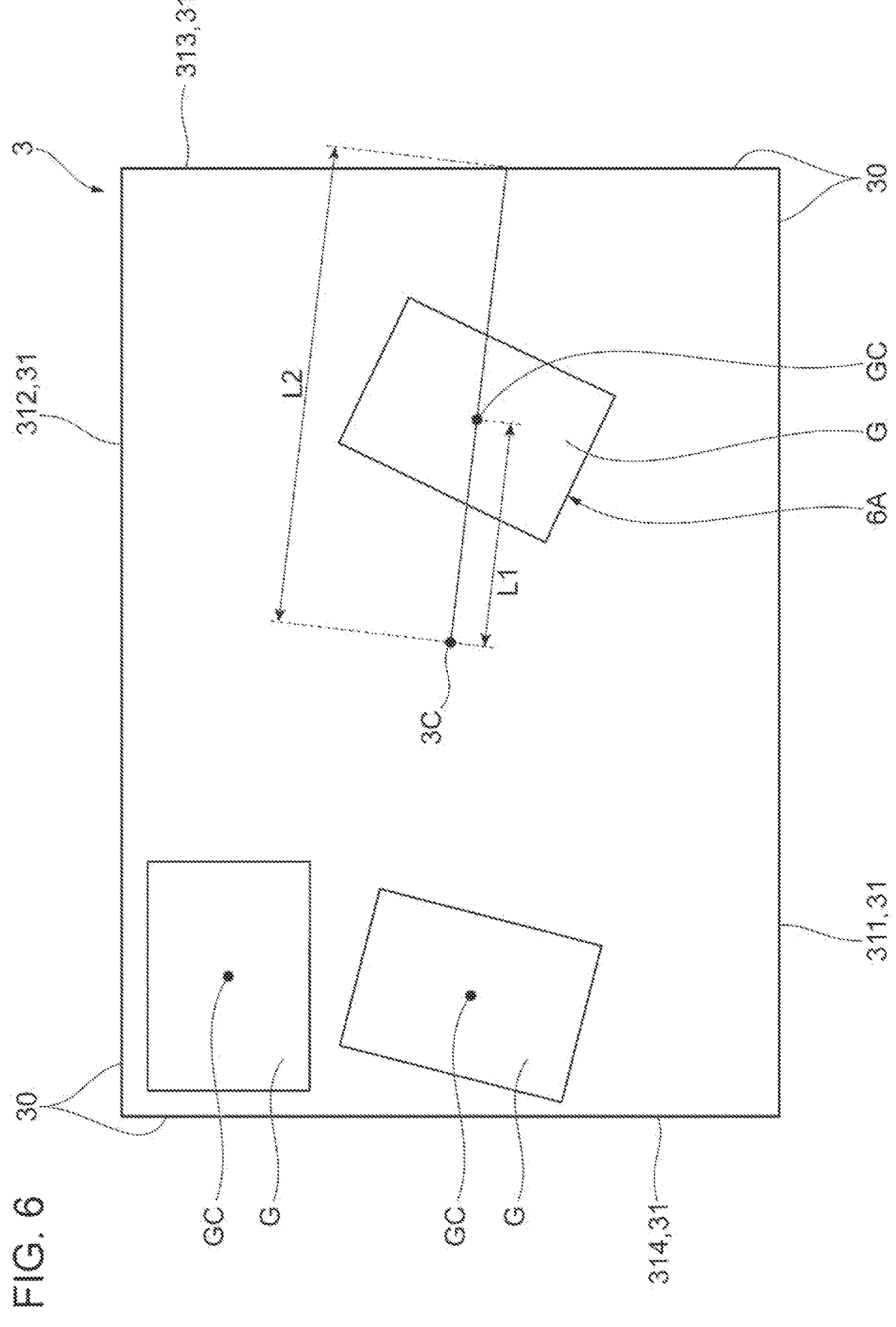
FIG. 6 is a diagram illustrating a state in a case where plural documents are placed on the document stage.

FIG. 6 is a diagram illustrating a state in a case where plural documents G are placed on the document stage 3.

In a case where plural documents G are placed on the document stage 3 as illustrated in FIG. 6, the CPU 11a changes a process that is performed in association with reading of the plural documents G, in accordance with the position of one document G included in the plural documents G.

Specifically, the CPU 11a changes a process that is performed in association with reading of the plural documents G, in accordance with the position of the document G closest to the stage center part 3C among the plural documents G.

In FIG. 6, the document G indicated by a reference numeral 6A is the document G closest to the stage center part 3C.

In a case where plural documents G are placed on the document stage 3, the CPU 11a first identifies the document G closest to the stage center part 3C among the plural documents G. The CPU 11a identifies the document G closest to the stage center part 3C on the basis of, for example, the position of the document center part GC of each of the plural documents G.

In the example illustrated in FIG. 6, the CPU 11a identifies the document G indicated by the reference numeral 6A as the document G closest to the stage center part 3C.

In a case where the position of the identified document G is a position close to the outer edge 30 of the document stage 3, the CPU 11a does not allow reading of the plural documents G to be performed.

More specifically, in a case where, for example, the direct distance L1 for the identified document G is greater than or equal to 50% of the length L2, the CPU 11a does not allow reading of the plural documents G to be performed.

On the other hand, in a case where the position of the document G closest to the center part 3C of the document stage 3 is at the stage center part 3C or a position close to the stage center part 3C, the CPU 11a allows reading of the plural documents G to be performed.

In other words, in a case where the position of the document G closest to the center part 3C of the document stage 3 is not a position close to the outer edge 30 of the document stage 3, the CPU 11a allows reading of the plural documents G to be performed.

Specifically, in a case where, for example, the direct distance L1 for the document G closest to the center part 3C of the document stage 3 is less than 50% of the length L2, the CPU 11a allows reading of the plural documents G to be performed.

Figure 7:
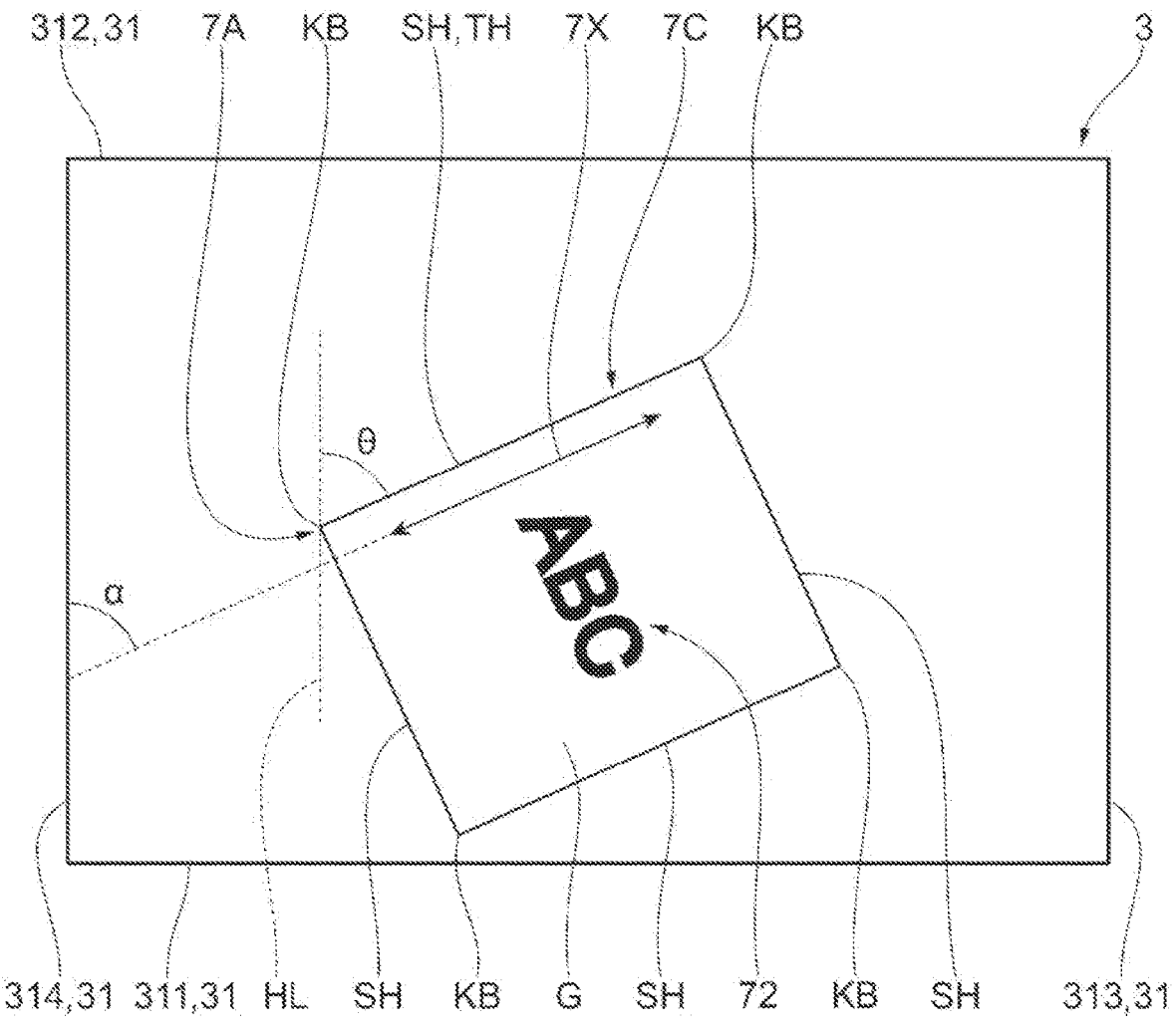
FIG. 7 is a diagram illustrating a form of placement of a document on the document stage.

FIG. 7 is a diagram illustrating another form of placement of the document G on the document stage 3.

The example in FIG. 7 illustrates a form in which the document G is placed and slanted on the document stage 3.

In this exemplary embodiment, the slant of the document G is also taken into consideration. The CPU 11a changes a process that is performed in association with reading of the document G, in accordance with the slant of the document G on the document stage 3 on which the document G is placed.

Specifically, in a case where the slant of the document G on the document stage 3 is larger than a predetermined threshold, the CPU 11a does not allow the specific process that is performed in association with reading of the document G to be performed as described above.

On the other hand, in a case where the slant of the document G on the document stage 3 is smaller than the predetermined threshold and the document G is straightened or nearly straightened, the CPU 11a allows the specific process to be performed.

Specifically, in the case where the slant of the document G on the document stage 3 is larger than the predetermined threshold, the CPU 11a does not allow capturing of a still image of the document stage 3 to be performed as described above. In this case, the CPU 11a does not allow storing, in the secondary storage unit 12, of a reading result obtained by reading the document G to be performed as described above.

On the other hand, in the case where the slant of the document G on the document stage 3 is smaller than the predetermined threshold, the CPU 11a allows capturing of a still image of the document stage 3 to be performed. In this case, the CPU 11a further allows storing of a reading result in the secondary storage unit 12 to be performed.

As described above, in this exemplary embodiment, there may be a case where the user places the document G on the document stage 3 not for the purpose of performing reading of the document G but for the purpose of temporarily placing the document G.

In this case, the user places the document G on the document stage 3 without a thought, and the placed document G might not be straightened but may be slanted.

In this case, in this exemplary embodiment, image capturing of the document stage 3 by the camera 5, which is an image capturing device, is not performed, and storing of a reading result in the secondary storage unit 12 is not performed.

To identify the slant of the document G on the document stage 3, the CPU 11a first identifies, for example, the corner part KB closest to the left-side edge 314 among the four corner parts KB of the document G.

More specifically, the CPU 11a assumes, for each corner part KB of the four corner parts KB, the shortest straight line that connects the corner part KB and the left-side edge 314, and identifies the closest corner part KB on the basis of the lengths of the respective shortest straight lines.

In the example illustrated in FIG. 7, the corner part KB indicated by a reference numeral 7A is the corner part KB closest to the left-side edge 314.

Next, the CPU 11a identifies, among the four sides SH of the document G having a rectangular shape, a side SH that extends from the corner part KB closest to the left-side edge 314 toward the far-side edge 312. In the example illustrated in FIG. 7, the CPU 11a identifies the side SH indicated by a reference numeral 7C.

Further, the CPU 11a assumes a parallel straight line HL that is a straight line passing through the corner part KB closest to the left-side edge 314 and parallel to the left-side edge 314.

In the specification, the side SH that extends from corner part KB closest to the left-side edge 314 toward the far-side edge 312 is hereinafter referred to as "target side TH".

The CPU 11a calculates the angle θ between the target side TH and the parallel straight line HL and assumes this angle to be the slant of the document G.

In a case where the angle θ is greater than or equal to a predetermined angle, the CPU 11a does not allow reading of the document G to be performed. On the other hand, in a case where the angle θ is less than the predetermined angle, the CPU 11a allows reading of the document G to be performed.

The predetermined angle is, for example, 45°. Note that the predetermined angle is not limited to this angle and may be an angle other than 45°. The predetermined angle θ may be changed in accordance with a user instruction.

Alternatively, in a case where the angle θ of the slant of the document G is larger than a predetermined first threshold (for example, 20°) and smaller than a predetermined second threshold (for example, 70°) that is larger than the first threshold, the CPU 11a may determine that the document G is slanted.

On the other hand, in a case where the angle θ of the slant of the document G is smaller than the first threshold or larger than the second threshold, the CPU 11a may determine that the document G is not slanted.

There may be a case where the user places the document G on the document stage 3 in a landscape orientation such that, for example, the document G is rotated clockwise about 90°.

In this case, when the second threshold is set as described above, the angle θ of the slant of the document G placed in a landscape orientation is smaller than the first threshold described above or larger than the second threshold described above.

In this case, reading of the document G is performed.

Alternatively, the CPU 11a may identify the up-down direction of the document G on the basis of an image formed on the document G placed on the document stage 3.

In accordance with the angle α between the up-down direction identified on the basis of the image formed on the document G and a predetermined reference direction, the CPU 11a may change a process that is performed in association with reading of the document G.

Specifically, in this case, in a case where the angle α is larger than a predetermined threshold, the CPU 11a does not allow image capturing of the document stage 3 to be performed and does not allow storing of a reading result in the secondary storage unit 12 to be performed.

On the other hand, in a case where the angle α is smaller than the predetermined threshold, the CPU 11a allows image capturing of the document stage 3 to be performed and allows storing of a reading result in the secondary storage unit 12 to be performed.

In a case of identifying the up-down direction of the document G on the basis of an image formed on the document G, the CPU 11a identifies the up-down direction of the document G on the basis of, for example, the up-down direction of letters included in an image 72 formed on the document G as illustrated in FIG. 7. In other words, the CPU 11a assumes the up-down direction of letters included in the image 72 formed on the document G to be the up-down direction of the document G.

In the example illustrated in FIG. 7, the CPU 11a identifies the direction indicated by the arrow 7X as the up-down direction of the document G.

Next, the CPU 11a assumes, for example, the direction in which the left-side edge 314 extends to be the predetermined reference direction and calculates the angle α between the identified up-down direction and the predetermined reference direction.

In a case where the angle α is greater than or equal to a predetermined threshold (for example, 45°), the CPU 11a does not allow image capturing of the document stage 3 to be performed and does not allow storing of a reading result in the secondary storage unit 12 to be performed.

In a case where the angle α is less than the predetermined threshold, the CPU 11a allows image capturing of the document stage 3 to be performed and allows storing of a reading result in the secondary storage unit 12 to be performed.

In a case where this process is performed, when the user places the document G in a landscape orientation such that, for example, the document G is rotated clockwise about 90°, reading of the document G is not performed.

Figure 8:
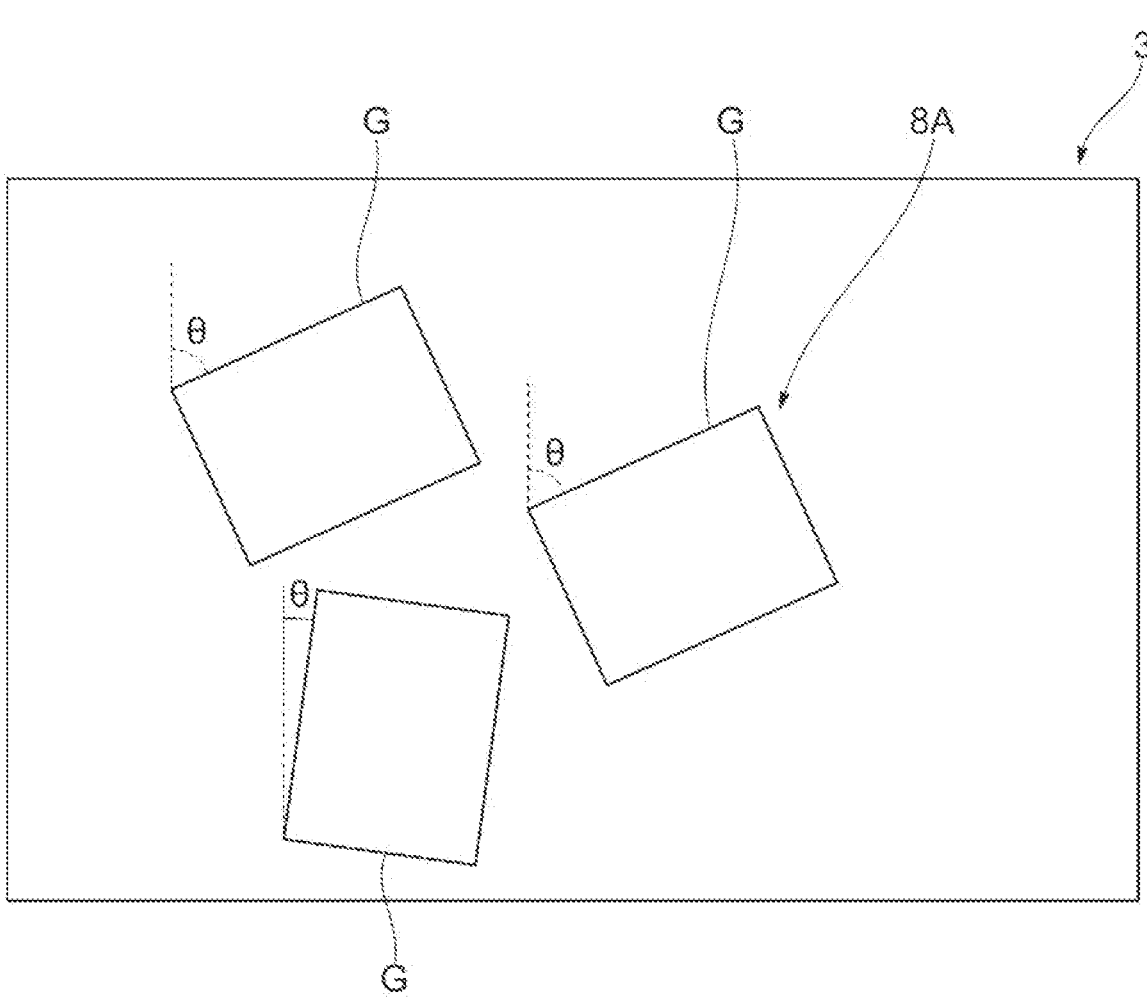
FIG. 8 is a diagram illustrating another state of the document stage on which documents are placed.

As illustrated in FIG. 8 (which is a diagram illustrating another state of the document stage 3 on which documents G are placed), in a case where plural documents G are placed on the document stage 3, the CPU 11*a* changes a process that is performed in association with reading of the plural documents G, in accordance with the slant of one document G included in the plural documents G.

Specifically, in this case, the CPU 11*a* first identifies the document G having the largest slant among the plural documents G. In the example illustrated in FIG. 8, the CPU 11*a* identifies the document G indicated by a reference numeral 8A as the document G having the largest slant.

The CPU 11*a* changes a process that is performed in association with reading of the plural documents G, in accordance with the slant of the document G having the largest slant.

Specifically, in a case where the slant of the document G having the largest slant exceeds a predetermined threshold, the CPU 11*a* does not allow reading of the plural documents G to be performed.

On the other hand, in a case where the slant of the document G having the largest slant does not exceed the predetermined threshold, the CPU 11*a* allows reading of the plural documents G to be performed.

Here, the predetermined threshold is, for example, 45° as described above.

FIG. 9 is a flowchart illustrating a flow of a series of processes described above performed by the CPU 11*a*.

In this exemplary embodiment, when the documents G are placed on the document stage 3, the CPU 11*a* first obtains, for each of the documents G, the direct distance L1 from the stage center part 3C to the document center part GC (step S101).

Next, the CPU 11*a* identifies the document G closest to the stage center part 3C on the basis of the obtained direct distances L1 (step S102).

The CPU 11*a* determines whether the position of the closest document G is a position close to the outer edge 30 of the document stage 3 (step S103). More specifically, the CPU 11*a* determines whether the direct distance L1 between the document center part GC of the closest document G and the stage center part 3C is greater than or equal to 50% of the length L2 described above.

In a case where it is determined in step S103 that the position of the closest document G is a position close to the outer edge 30 of the document stage 3, the flow proceeds to the process in step S106.

In the case where it is determined in step S103 that the position of the closest document G is a position close to the outer edge 30 of the document stage 3, the documents G on the document stage 3 are placed close to the outer edge 30 of the document stage 3.

On the other hand, in a case where it is determined in step S103 that the position of the closest document G is not a position close to the outer edge 30 of the document stage 3, the CPU 11*a* performs a process of obtaining the slant angle of each of the documents G (step S104).

Next, the CPU 11*a* determines whether the document G having a slant angle that is greater than or equal to a predetermined threshold is present (step S105).

In a case where the CPU 11*a* determines that the document G having a slant angle that is greater than or equal to the predetermined threshold is not present, the flow proceeds to the process in step S108, and the CPU 11*a* performs a reading process for the documents G.

Specifically, the CPU 11*a* operates the camera 5, which is an image capturing device, to allow capturing of a still image of the document stage 3. Accordingly, a reading result including the captured image and document images are stored in the secondary storage unit 12.

On the other hand, in this exemplary embodiment, in a case where it is determined in step S105 that the document G having a slant angle that is greater than or equal to the predetermined threshold is present or in the case where it is determined in step S103 that the position of the closest document G is a position close to the outer edge 30 of the document stage 3, the process in step S106 is performed.

In the process in step S106, an inquiry about whether to perform reading of the documents G is made to the user. Specifically, an inquiry about whether to perform reading of the documents G is made to the user via the display device 7 (see FIG. 1).

In the process in step S105, the slant angle is grasped for each of the documents G and determination as to whether each of the grasped slant angles is greater than or equal to the predetermined threshold is performed as described above.

However, the process is not limited to this process, and in step S105, among the slant angles grasped for the respective documents G, the largest slant angle may be identified and determination as to whether the identified largest slant angle is greater than or equal to the predetermined threshold may be performed.

In a case where the largest slant angle is greater than or equal to the predetermined threshold, the flow may proceed to the process in step S106, and in a case where the largest slant angle is less than the predetermined threshold, the flow may proceed to the process in step S108.

In the process in step S107, it is determined whether an instruction for performing reading of the documents G is given by the user.

In a case where an instruction for performing reading of the documents G is given by the user, the CPU 11*a* performs reading of the documents G (step S108). On the other hand, in a case where an instruction for performing reading of the documents G is not given by the user, the CPU 11*a* ends the series or processes without performing reading of the documents G.

In a case where reading of the documents G is performed, a reading result including a captured image and document images are stored in the secondary storage unit 12. In a case where reading of the documents G is not performed, storing of a reading result in the secondary storage unit 12 is not performed.

In the example processes illustrated in FIG. 9, even in a case where the document G is placed at a position close to the outer edge 30 of the document stage 3 or in a case where the slant of the document G is large, reading of such a document is performed on condition that an instruction is given by the user.

Accordingly, in the example processes, in a case where the user intentionally places the document G at a position close to the outer edge 30 of the document stage 3 to perform reading of the document G or in a case where the user intentionally slants the document G to perform reading of the document G, reading of such a document is performed.

In a case where an inquiry as described above is not made, when the user places the document G at a position close to the outer edge 30 of the document stage 3 or when the user slants and places the document G, reading of the document G is not performed.

In contrast, in this exemplary embodiment, reading of the document G is performed on condition that an instruction is given by the user. In this case, when the user intentionally places the document G at a position close to the outer edge 30 of the document stage 3 to perform reading of the document G or when the user intentionally slants the document G to perform reading of the document G, reading of such a document is performed.

In the processes illustrated in FIG. 9, although determination as to the positions of the documents G is performed first and determination as to the slants of the documents G is performed next, the order of processes is not limited to this order. Determination as to the slants of the documents G may be performed first and determination as to the positions of the documents G may be performed next.

Although two determinations, namely, determination as to the positions of the documents G and determination as to the slants of the documents G, are performed in the processes described above, these two determinations need not be performed, and only one of the two determinations may be performed. On the basis of only the result of one of the two determinations, the above-described process associated with reading of the documents G may be performed.

Reading of the documents G is allowed to be performed or reading of the documents G is not allowed to be performed in accordance with the positions of placement of the documents G and the slants of the documents G in the processes described above.

The processes are not limited to this and, for example, image processing may be allowed to be performed or image processing might not be allowed to be performed in accordance with the positions of placement of the documents G and the slants of the documents G.

Specifically, for example, in a case where the position of placement of the document G is a position close to the outer edge 30 of the document stage 3 or in a case where the document G is slanted, image processing for a captured image and document images included in a reading result might not be allowed to be performed.

In a case where the position of placement of the document G is not a position close to the outer edge 30 of the document stage 3 or in a case where the document G is not slanted, the image processing may be allowed to be performed.

Alternatively, in the case where the position of placement of the document G is a position close to the outer edge 30 of the document stage 3 or in the case where the document G is slanted, for example, a process may be performed in which reading of the document G as a still image is allowed to be performed and storing, in the secondary storage unit 12, of a reading result that includes the still image is not allowed to be performed.

In other words, in the case where the position of placement of the document G is a position close to the outer edge 30 of the document stage 3 or in the case where the document G is slanted, a process may be performed in which reading of the document G as a still image is allowed to be performed and a reading result that includes the still image is discarded.

In this case, when the position of placement of the document G is not a position close to the outer edge 30 of the document stage 3 or when the document G is not slanted, reading of the document G as a still image is performed, and further, a reading result that includes the still image is stored in the secondary storage unit 12.

Alternatively, in the case where the position of placement of the document G is a position close to the outer edge 30 of the document stage 3 or in the case where the document G is slanted, for example, a reading result may be stored in the secondary storage unit 12, and thereafter, an inquiry, such as "do you want to delete the captured image?", may be made to the user to ask the user if the reading result may be deleted.

In the case where the position of placement of the document G is not a position close to the outer edge 30 of the document stage 3 or in the case where the document G is not slanted, an inquiry as described above is not made to the user.

Figure 10:
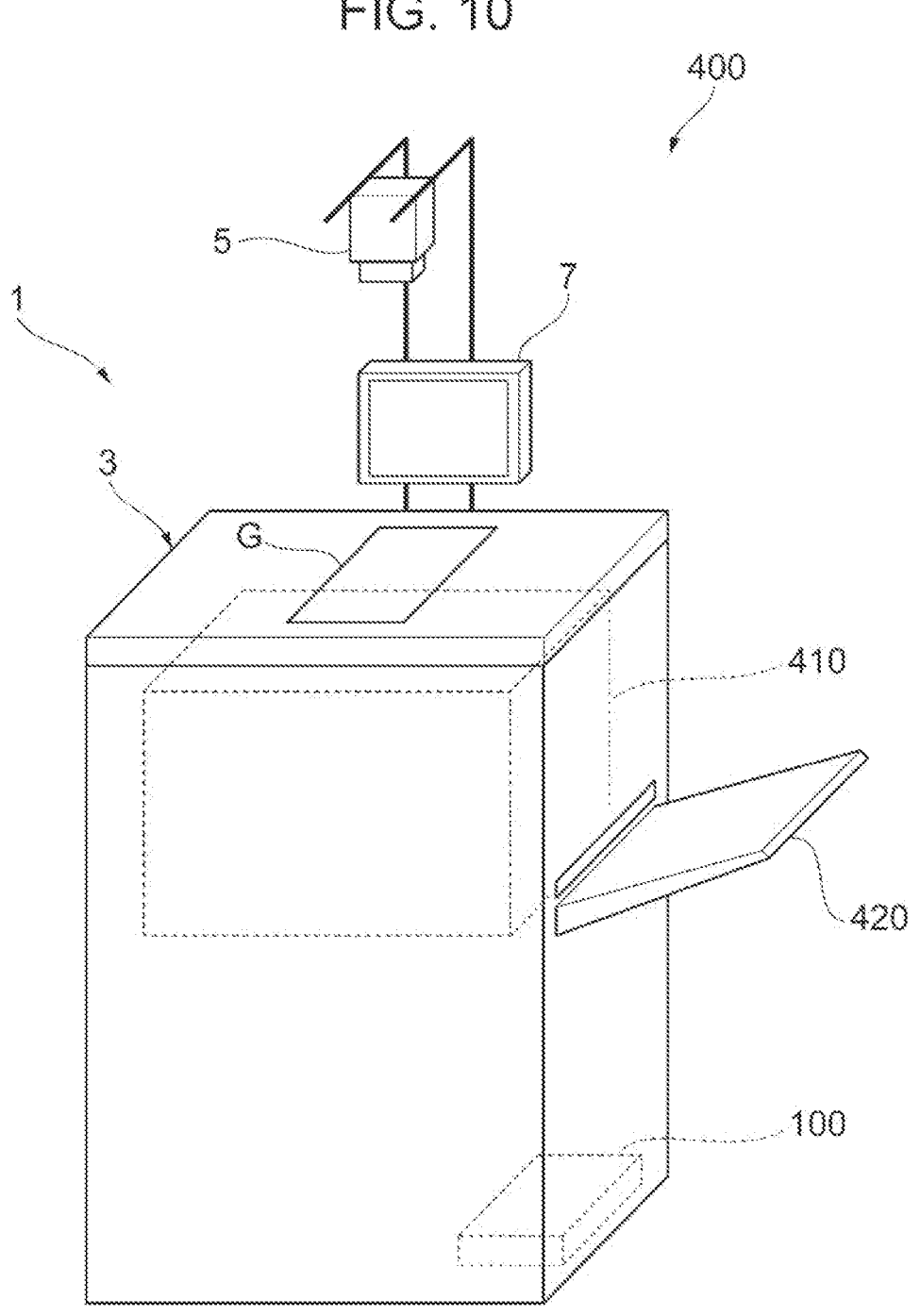
FIG. 10 is a diagram illustrating an image forming apparatus.

Further, as illustrated in FIG. 10 (which is a diagram illustrating an image forming apparatus), the image reading apparatus 1 described above may be provided as part of an image forming apparatus 400.

In the image forming apparatus 400, the image reading apparatus 1 described above is provided on the upper part of the image forming apparatus 400.

The image reading apparatus 1 in this case is also provided with the document stage 3 that supports the document G from underneath, the camera 5 that captures an image of the document G placed on the document stage 3, and the display device 7 that displays information for the user as in the configuration described above.

The image forming apparatus 400 is further provided with the information processing apparatus 100 that performs the processes described above. In other words, the image forming apparatus 400 is provided with the information processing apparatus 100 that performs processing of information related to the image reading apparatus 1.

The image forming apparatus 400 further includes an image former 410 that forms an image on a recording material, such as a sheet, inside the image forming apparatus 400.

The image former 410 forms an image on a recording material supplied from, for example, a recording material accommodating unit (not illustrated) by using, for example, an inkjet system or an electrophotographic system.

More specifically, the image former 410 forms an image on a recording material by using an inkjet system or an electrophotographic system on the basis of a captured image obtained by the image reading apparatus 1 or image data transmitted to the image forming apparatus 400 from outside the image forming apparatus 400.

The recording material on which the image has been formed is conveyed to a sheet placing unit 420 and placed on the sheet placing unit 420.

In the example configuration illustrated in FIG. 10, in accordance with the form of placement of the document G placed on the document stage 3, the information processing apparatus 100 changes a process that is performed for the document G.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor configured to:

obtain information about a form of placement of a document placed on a document stage of an apparatus that performs reading of the document by capturing an image of the document stage on which the document is placed; and change a process that is performed in association with reading of the document, in accordance with the form of placement of the document on the document stage.

(((2)))

The information processing apparatus according to (((1))), wherein:

the processor is configured to:

change the process that is performed in association with reading of the document, in accordance with a position of the document placed on the document stage.

(((3)))

The information processing apparatus according to (((2))), wherein:

the processor is configured to:

in a case where the position of the document placed on the document stage is a predetermined specific position, not allow a specific process that is performed in association with reading of the document to be performed, and in a case where the position of the document placed on the document stage is not the specific position, allow the specific process to be performed.

(((4)))

The information processing apparatus according to (((3))), wherein:

the processor is configured to:

in a case where the position of the document placed on the document stage is the specific position, not allow storing, in an information storage, of a reading result obtained by reading of the document by the apparatus to be performed, and in a case where the position of the document placed on the document stage is not the specific position, allow the storing in the information storage to be performed.

(((5)))

The information processing apparatus according to (((3))), wherein:

the processor is configured to:

in a case where the position of the document placed on the document stage is a position close to an outer edge of the document stage, not allow the specific process to be performed, and in a case where the position of the document placed on the document stage is at a center part of the document stage or a position close to the center part, allow the specific process to be performed.

(((6)))

The information processing apparatus according to (((3))), wherein:

the processor is configured to:

in a case where the position of the document placed on the document stage is within a predetermined surrounding region that is positioned around a center part of the document stage, not allow the specific process to be performed, and in a case where the position of the document placed on the document stage is within a region surrounded by the surrounding region, allow the specific process to be performed.

(((7)))

The information processing apparatus according to any one of (((2))) to (((6))), wherein:

the processor is configured to:

in a case where a plurality of documents are placed on the document stage, change a process that is performed in association with reading of the plurality of documents, in accordance with a position of a document included in the plurality of documents.

(((8)))

The information processing apparatus according to (((7))), wherein:

the processor is configured to:

change the process that is performed in association with reading of the plurality of documents, in accordance with a position of a document closest to a center part of the document stage among the plurality of documents.

(((9)))

The information processing apparatus according to (((1))), wherein:

the processor is configured to:

change the process that is performed in association with reading of the document, in accordance with a slant of the document on the document stage on which the document is placed.

(((10)))

The information processing apparatus according to (((9))), wherein:

the processor is configured to:

in a case where the slant of the document on the document stage is larger than a predetermined threshold, not allow a specific process that is performed in association with reading of the document to be performed, and in a case where the slant of the document on the document stage is smaller than the predetermined threshold, allow the specific process to be performed.

(((11)))

The information processing apparatus according to (((10))), wherein:

the processor is configured to:

in a case where the slant of the document on the document stage is larger than the predetermined threshold, not allow storing, in an information storage, of a reading result obtained by reading of the document by the apparatus to be performed, and in a case where the slant of the document on the document stage is smaller than the predetermined threshold, allow storing of the reading result in the information storage to be performed.

(((12)))

The information processing apparatus according to any one of (((9))) to (((11))), wherein:

the processor is configured to:

change the process that is performed in association with reading of the document, in accordance with an angle between a predetermined reference direction and an up-down direction of the document, the up-down direction being identified based on an image formed on the document placed on the document stage.

(((13)))

The information processing apparatus according to any one of (((9))) to (((12))), wherein:

the processor is configured to:

in a case where a plurality of documents are placed on the document stage, change a process that is performed in association with reading of the plurality of documents, in accordance with a slant of a document included in the plurality of documents.

((14)))

The information processing apparatus according to (((13))), wherein:

the processor is configured to:

change the process that is performed in association with reading of the plurality of documents, in accordance with a slant of a document having a largest slant among the plurality of documents.

(((15)))

An image reading apparatus comprising:

an apparatus that performs reading of a document by capturing an image of a document stage on which the document is placed; and an information processing apparatus that processes information related to the apparatus, wherein:

the information processing apparatus comprises the information processing apparatus according to any one of (((1))) to (((14))).

(((16)))

An image forming apparatus comprising:

an apparatus that performs reading of a document by capturing an image of a document stage on which the document is placed;

an information processing apparatus that processes information related to the apparatus; and an image former that forms an image on a recording material, wherein:

the information processing apparatus comprises the information processing apparatus according to any one of (((1))) to (((14))).

(((17)))

A program causing a computer to execute a process comprising:

obtaining information about a form of placement of a document placed on a document stage of an apparatus that performs reading of the document by capturing an image of the document stage on which the document is placed; and changing a process that is performed in association with reading of the document, in accordance with the form of placement of the document on the document stage.

What is claimed is:

1. An information processing apparatus comprising:

a processor configured to:

obtain information about a form of placement of a document placed on a document stage of an apparatus that performs reading of the document by capturing an image of the document stage on which the document is placed; and change a process that is performed in association with reading of the document, in accordance with the form of placement of the document on the document stage, wherein the processor is configured to, in a case where a position of the document placed on the document stage is a position close to an outer edge of the document stage, not allow a specific process to be performed, and in a case where the position of the document placed on the document stage is at a center part of the document stage or a position close to the center part, allow the specific process to be performed.

2. The information processing apparatus according to claim 1, wherein:

the processor is configured to:

in a case where the position of the document placed on the document stage is the position close to the outer edge of the document stage, not allow storing, in an information storage, of a reading result obtained by reading of the document by the apparatus to be performed, and in a case where the position of the document placed on the document stage is not the position close to the outer edge of the document stage, allow the storing in the information storage to be performed.

3. The information processing apparatus according to claim 1, wherein:

the processor is configured to:

in a case where the position of the document placed on the document stage is within a predetermined surrounding region that is positioned around a center part of the document stage, not allow the specific process to be performed, and in a case where the position of the document placed on the document stage is within a region surrounded by the surrounding region, allow the specific process to be performed.

4. The information processing apparatus according to claim 1, wherein:

the processor is configured to:

change the process that is performed in association with reading of the document, in accordance with a slant of the document on the document stage on which the document is placed.

5. The information processing apparatus according to claim 4, wherein:

the processor is configured to:

in a case where the slant of the document on the document stage is larger than a predetermined threshold, not allow the specific process that is performed in association with reading of the document to be performed, and in a case where the slant of the document on the document stage is smaller than the predetermined threshold, allow the specific process to be performed.

6. The information processing apparatus according to claim 5, wherein:

the processor is configured to:

in a case where the slant of the document on the document stage is larger than the predetermined threshold, not allow storing, in an information storage, of a reading result obtained by reading of the document by the apparatus to be performed, and in a case where the slant of the document on the document stage is smaller than the predetermined threshold, allow storing of the reading result in the information storage to be performed.

7. The information processing apparatus according to claim 4, wherein:

the processor is configured to:

change the process that is performed in association with reading of the document, in accordance with an angle between a predetermined reference direction and an up-down direction of the document, the up-down direction being identified based on an image formed on the document placed on the document stage.

8. The information processing apparatus according to claim 4, wherein:

the processor is configured to:

in a case where a plurality of documents, including the document, are placed on the document stage, change a process that is performed in association with reading of the plurality of documents, in accordance with a slant of the document.

9. The information processing apparatus according to claim 8, wherein:

the processor is configured to:

change the process that is performed in association with reading of the plurality of documents, in accordance with a slant of the document having a largest slant among the plurality of documents.

10. An image reading apparatus comprising:

an apparatus that performs reading of a document by capturing an image of a document stage on which the document is placed; and an information processing apparatus that processes information related to the apparatus, wherein:

the information processing apparatus comprises the information processing apparatus according to claim 1.

11. An image forming apparatus comprising:

an apparatus that performs reading of a document by capturing an image of a document stage on which the document is placed;

an information processing apparatus that processes information related to the apparatus; and an image former that forms an image on a recording material, wherein:

the information processing apparatus comprises the information processing apparatus according to claim 1.

12. A non-transitory computer readable medium storing a program causing a computer to execute a process for information processing, the process comprising:

obtaining information about a form of placement of a document placed on a document stage of an apparatus that performs reading of the document by capturing an image of the document stage on which the document is placed; and changing a process that is performed in association with reading of the document, in accordance with the form of placement of the document on the document stage, wherein in a case where a position of the document placed on the document stage is a position close to an outer edge of the document stage, a specific process is not allowed to be performed, and in a case where the position of the document placed on the document stage is at a center part of the document stage or a position close to the center part, the specific process is allowed to be performed.

13. An information processing method comprising:

obtaining information about a form of placement of a document placed on a document stage of an apparatus that performs reading of the document by capturing an image of the document stage on which the document is placed; and changing a process that is performed in association with reading of the document, in accordance with the form of placement of the document on the document stage, wherein in a case where a position of the document placed on the document stage is a position close to an outer edge of the document stage, a specific process is not allowed to be performed, and in a case where the position of the document placed on the document stage is at a center part of the document stage or a position close to the center part, the specific process is allowed to be performed.

* * * * *